UNITED STATES PATENT OFFICE.

FREDERICK KOSKUL, OF PHILADELPHIA, PENNSYLVANIA.

IMPROVEMENT IN THE MANUFACTURE OF IMITATION INTARSIA TILES.

Specification forming part of Letters Patent No. 214,826, dated April 29, 1879; application filed December 10, 1877.

*To all whom it may concern:*

Be it known that I, FREDERICK KOSKUL, of the city of Philadelphia, State of Pennsylvania, have invented a new and useful Improvement in the Manufacture of Imitation Intarsia Tiles, Table-Tops, Panels, and Similar Ornaments, of which the following is a specification.

The object of this invention is to effect the ornamentation of different articles by producing thereon the imitation of that which is more beautiful in ornamental forms or figures; and it consists in a certain new and improved compound applied to the surface of the article to be ornamented, which application of the ornamenting material or compound is aided by raised lines or surfaces in relief, substantially as hereinafter more fully set forth.

The ornamentation of articles by casting or pressing into molds with intaglio or intagliated surfaces filled with different-colored materials is open to the objection that such articles can never be brought to a durable and perfect polish. Stamping, printing, stenciling, or lithographing the article is too easily detected as imitation.

My compound, which forms an artificial wood, consists of the following: one hundred (100) parts of silicate of soda, thirty (30) parts of carbonate of magnesia, thirty (30) parts of pulverized chalk, and twenty (20) parts of sulphate of alumina. These are combined and boiled with a solution of gelatine or gum-arabic and glue. To this is added about sixty (60) parts of prepared finely-sifted sawdust, saturated with a water-proof liquid compound, completing my artificial wood.

The following compound, which forms a stone paste, may be also used in lieu of the above-described compound in carrying out my invention: ordinary lime, hydraulic lime or cement, chalk, soluble glass, alumina, and chloride of calcium, with or without the addition of sand or pounded stone. I do not, however, confine myself to the precise details of carrying out my invention.

The artificial wood or stone-paste compound is pressed into slate or other molds with the required pattern or design previously impressed or otherwise placed thereon, the said pattern or design being sunk into the mold. When dry, the compound or paste is removed from the mold with the design or pattern impressed thereon in relief. By the design or pattern standing in relief it serves as a guide in further ornamenting the molded object or article with paint. The paint, when dry, is treated to a coat of transparent copal-varnish. When this is dry the surface is rubbed down with pumice-stone. This will cover the painted surface, care being taken not to rub the applied colors through. This done, another coat of varnish is applied, and when dry rubbed and polished similar in treatment to the producing of enamel in slate mantels.

It is not difficult at all to produce, by exercising great care, a perfect mirror polish or gloss which will remain durable.

Having thus fully described my invention, I claim and desire to secure by Letters Patent of the United States—

1. The herein-described process of ornamenting objects or articles by the placing in molds with the desired pattern or design to be imparted to the molded article sunk in the mold of an artificial wood or paste compound, and after the removal of the molded article treating the latter with transparent varnish, after first painting the same, and then rubbing the painted and varnished surface with pumice-stone, substantially as and for the purpose set forth.

2. The herein-described process of ornamenting objects or articles by the placing in intaglio molds of an artificial wood or paste composition, and after removing the molded article painting and varnishing the same, then rubbing this surface with pumice-stone and again varnishing the surface, and when dry rubbing it a second time, and giving it a polish imparted thereto similarly to producing enamel in slate mantels, substantially as set forth.

FREDERICK KOSKUL.

Witnesses:
JOHN ROMBOLD,
HENRY HAUSMAN.